(12) United States Patent
Walters (10) Patent No.: US 10,242,544 B1
(45) Date of Patent: Mar. 26, 2019

(54) PHYSIOLOGICAL-BASED DETECTION AND FEEDBACK SYSTEMS AND METHODS

(71) Applicant: Securus Technologies, Inc., Dallas, TX (US)

(72) Inventor: Arthur P. Walters, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 146 days.

(21) Appl. No.: 14/990,919

(22) Filed: Jan. 8, 2016

(51) Int. Cl.
*G08B 13/196* (2006.01)
*G08B 13/19* (2006.01)

(52) U.S. Cl.
CPC ....... *G08B 13/19697* (2013.01); *G08B 13/19* (2013.01); *G08B 13/19621* (2013.01); *G08B 13/19671* (2013.01)

(58) Field of Classification Search
CPC .......................... G08B 13/19697; G08B 13/19
See application file for complete search history.

(56) References Cited

U.S. PATENT DOCUMENTS

| | | |
|---|---|---|
| 8,965,090 B1 | 2/2015 | Khachaturian et al. |
| 2008/0146890 A1* | 6/2008 | LeBoeuf ............... A61B 5/0059 600/300 |
| 2011/0190636 A1* | 8/2011 | Saint Clair ............ A61B 5/015 600/473 |
| 2014/0160250 A1* | 6/2014 | Pomerantz ......... H04N 5/23229 348/47 |
| 2014/0161421 A1* | 6/2014 | Shoemaker .......... G11B 27/028 386/278 |
| 2015/0348569 A1* | 12/2015 | Allam ..................... G10L 25/48 704/257 |
| 2016/0182850 A1* | 6/2016 | Thompson ........... H04N 9/8205 348/158 |

* cited by examiner

*Primary Examiner* — William C Vaughn, Jr.
*Assistant Examiner* — Jerry T Jean Baptiste
(74) *Attorney, Agent, or Firm* — Fogarty LLP (57) ABSTRACT

Systems and methods which detect in video and/or audio data a change in a physiological indicator of a person captured by the video and/or audio data, and which provide feedback indicating when the change in the physiological indicator occurs, are described. A method uses an analytics module operating on at least one processor. Data is received from a video camera worn on a first person. The data is indicative of an interaction between the first person and a second person. A physiological indicator of the second person is detected by analyzing the data. A change in the physiological indicator in the data is determined. An indication of the change in the physiological indicator in the data is transmitted to a sensory device on the first person.

19 Claims, 3 Drawing Sheets

PHYSIOLOGICAL-BASED DETECTION AND FEEDBACK SYSTEMS AND METHODS

TECHNICAL FIELD

The present disclosure relates generally to detecting a possible event in communications data (e.g., video and/or audio data), and more particularly to detecting a change of a physiological indicator of a person within video and/or audio data and providing feedback when the change occurs.

BACKGROUND

The climate relating to law enforcement interactions with the public in the United States has drastically changed over the past few years. The public entrusts law enforcement officers to conduct themselves ethically and with a mutual respect for the public. However, some instances where law enforcement officers have purportedly not handled interactions with the public correctly have been a platform that some in the public have used to, at best, question law enforcement tactics, and, at worst, disparage the law enforcement officers.

Many instances where people in the public have questioned law enforcement tactics involve questions of whether the law enforcement officers used an excessive amount of force. In the past, these questions may not have been answered satisfactorily due to a lack of credible factual accounts of events. For example, the only available account was from a sole officer that was present and who was implicated in possible wrong-doing. In other instances, inconsistent eye-witness accounts could lead to more questions than answers.

Recently, many law enforcement departments have deployed video cameras ("dash-cams") on the dashboards of patrol cars in an attempt to clearly document law enforcement officer's interactions with the public. However, since these dash-cams are on fixed location on the patrol car, they may be unable to capture all events, such as when a law enforcement officer departs from the patrol car and pursues a suspect out of view of the dash-cam. Even more recently, law enforcement departments have deployed video cameras ("body cams") that are worn by individual law enforcement officers. The increased mobile nature of body cams can allow the body cams to capture more events and interactions of the law enforcement officers with the public.

The purpose of these video cameras is generally passive—that is, to capture data. The video is to provide a clear record of events that occur in the course and scope of an officer's duty. The video captured by these video cameras can be used as evidence of official misconduct or can be used to exculpate or exonerate a law enforcement officer.

SUMMARY

The present disclosure is directed to systems and methods which detect in video and/or audio data a change in a physiological indicator of a person captured by the video and/or audio data, and which provide feedback indicating when the change in the physiological indicator occurs. This information can be used in real-time to, for example, aid in early identification of escalating hostility and to alert an operations control center for dispatching of back-up.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

An embodiment is a method. The method uses an analytics module operating on at least one processor. Data is received from a video camera worn on a first person. The data is indicative of an interaction between the first person and a second person. A physiological indicator of the second person is detected by analyzing the data. A change in the physiological indicator in the data is determined. An indication of the change in the physiological indicator in the data is transmitted to a sensory device on the first person.

Another embodiment is a system. The system includes a video and audio device, an analytics system, and a sensory feedback device. The video and audio device is configured to be worn on a first person and is operable to capture video and audio data representative of at least a second person. The analytics system has an analytics module operable on at least one processor. The analytics system is operatively coupled to the video and audio device. The analytics module is operable to receive the video and audio data, operable to identify a physiological indicator of the second person in the video and audio data, and operable to determine a change in the physiological indicator in the video and audio data. The sensory feedback device is operatively coupled to the analytics system and is configured to be worn on the first person. The analytics module further is operable to transmit an indication of the change in the physiological indicator to the sensory feedback device. The sensory feedback device is operable to provide a sensory indication to the first person upon receipt of the indication of the change in the physiological indicator.

A further embodiment is a non-transitory computer-readable storage medium having a computer program embodied thereon. The computer program comprises program code instructions for detecting a physiological indicator in video and audio data, the video and audio data being representative of an interaction between a first person and a second person, the physiological indicator being of the second person; program code instructions for determining a change in the physiological indicator in the video and audio data; and program code instructions for transmitting to a sensory feedback device on the first person an indication of the change in the physiological indicator.

The foregoing has outlined rather broadly the features and technical advantages of the present embodiments in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described some embodiments in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Embodiments may take many different forms and should not be construed as limited to the disclosure set forth herein. Rather, these embodiments herein are provided so that this disclosure will be thorough and complete, and will fully convey the scope of the invention to those skilled in the art. One skilled in the art may be able to use the various embodiments of the invention.

Some embodiments described herein relate generally to the detection of a possible event based on physiological indicators of a person in video and audio data, and to the feedback of the possible event and/or physiological indicators to a person. Some embodiments are described with reference to communications and interactions between a person in a public or private setting and a law enforcement officer (e.g., police officer, sheriff's deputy, federal agent, prison guard, investigator, detective, federal marshall, etc.). However, other embodiments can be applied to other environments, for example, between students and teachers, between patients and nurses or doctors, or the like. The detecting of physiological indicators and/or a possible event based on the physiological indicators and feeding back such detection to a person can allow for earlier detection of escalating situations and can allow for earlier (and in some instances, automatic) alerting to dispatch another person to help control a situation.

Figure 1:
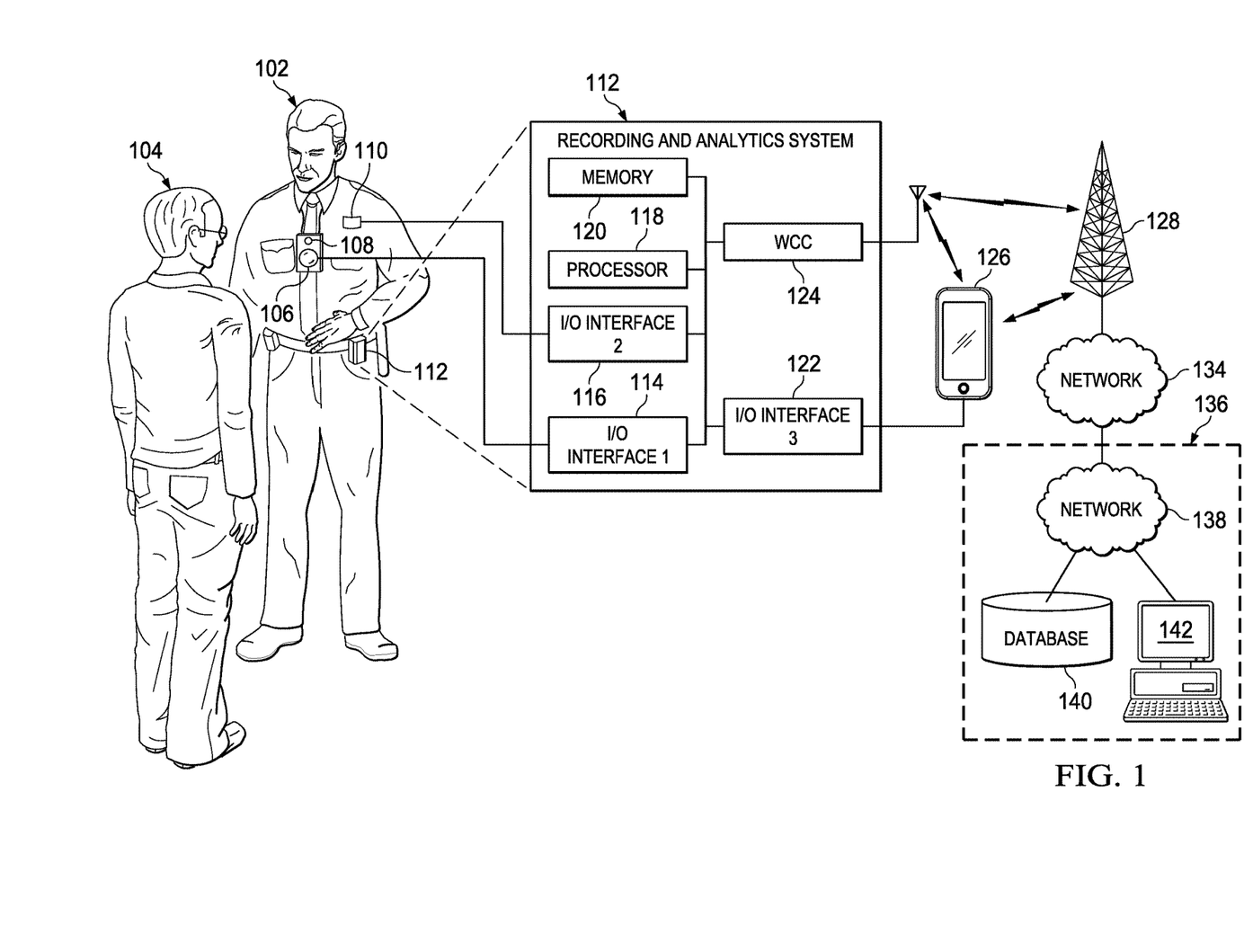
FIG. 1 is a diagrammatic illustration of a first example recording and analysis environment in accordance with some embodiments.

FIG. 1 is a diagrammatic illustration of an example recording and analysis environment in accordance with some embodiments. This embodiment is illustrated and discussed in the context of an apparatus and system that can be worn on a user. The illustration shows a first person 102 (e.g., a law enforcement officer) and a second person 104.

The first person 102 is wearing a bodily-worn video camera 106 that includes an audio device 108, such as a microphone. The video camera 106 and audio device 108 can be incorporated into a single packaged device to capture video data and audio data, in some embodiments, and in other embodiments, the audio device 108 is separate from the video camera 106. In some embodiments, the video camera 106 includes an infrared detector for capturing infrared radiation, which may be in addition to a camera for capturing visible light spectrum radiation. In other embodiments, the video camera 106 captures only video images.

The first person 102 is also wearing a sensory feedback device 110. The sensory feedback device 110 can be any type of device that is capable of providing an indication to the first person 102. In some examples, the sensory feedback device 110 is capable of providing a vibrational indication to the first person 102, such as by using a vibrational motor, which can be worn in, e.g., a protective vest. In some examples, the sensory feedback device 110 is an earbud with a speaker that is capable of providing tones to the first person 102.

The first person 102 is also wearing a recording and analytics system 112. As illustrated, the recording and analytics system 112, which may be referred to as a computing system, includes a first input/output (I/O) interface (I/O1) 114, a second I/O interface (I/O2) 116, one or more processor(s) (PROC) 118, memory (MEM) 120, and, optionally, a third I/O interface (I/O3) 122 and/or a wireless communication component (WCC) 124, with each coupled together, e.g., through a bus.

Each of the first, second, and third I/O interfaces 114, 116, and 122 is coupled to one or more input/output devices. The first I/O interface 114 is coupled to the video camera 106 with audio device 108, and the second I/O interface 116 is coupled to the sensory feedback device 110. As discussed further below, the optional third I/O interface 122 is coupled to a mobile communications device 126, such as a mobile cellular phone. In some embodiments, the first, second, and third I/O interfaces 114, 116, and 122 may be configured to coordinate I/O traffic between processor(s) 118, memory 120, and any peripheral devices in the device. In some embodiments, the first, second, and third I/O interfaces 114, 116, and 122 may perform any suitable protocol, timing or other data transformations to convert data signals from one component (e.g., video camera 106 with audio device 108) into a format usable by another component (e.g., processor(s) 118). In some embodiments, the first, second, and third I/O interfaces 114, 116, and 122 may include support for devices attached through various types of peripheral buses, such as a variant of the Peripheral Component Interconnect (PCI) bus standard or the Universal Serial Bus (USB) standard, for example. In some embodiments, the function of the first, second, and third I/O interfaces 114, 116, and 122 may be split into two or more separate components, such as a north bridge and a south bridge, for example. In addition, in some embodiments, some or all of the functionality of the first, second, and third I/O interfaces 114, 116, and 122, such as an interface to memory 120, may be incorporated into processor(s) 118.

In various embodiments, the recording and analytics system 112 may be a single-processor system including one processor 118, or a multi-processor system including two or more processors 118 (e.g., two, four, eight, or another suitable number). Processor(s) 118 may be any processor capable of executing program instructions. For example, in various embodiments, processor(s) 118 may be a general-purpose or embedded processor implementing any of a variety of instruction set architectures (ISAs), such as the x86, POWERPC®, ARM®, SPARC®, or MIPS® ISAs, or any other suitable ISA. In multi-processor systems, each of processors 118 may commonly, but not necessarily, implement the same ISA.

Memory 120 may be configured to store program instructions and/or data accessible by processor(s) 118. In various embodiments, memory 120 may be implemented using any suitable tangible or non-transitory storage memory, such as static random access memory (SRAM), synchronous dynamic RAM (SDRAM), nonvolatile/Flash-type memory, or any other type of memory. As illustrated, program instructions and data implementing certain operations, such as, for example, those described below, may be stored within memory 120 as program instructions and data storage, respectively. In other embodiments, program instructions and/or data may be received, sent or stored upon different types of computer-accessible media or on similar media separate from memory 120 or the recording and analytics system 112. Generally speaking, a computer-readable medium may include any tangible or non-transitory storage media or memory media such as magnetic or optical media—e.g., Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via the optional third I/O interface 122 and/or the optional wireless communication component 124.

The recording and analytics system 112 can operate a recording module and an analytics module on the processor(s) 118. The recording module and the analytics module may each include program code instructions stored on the memory 120 or other tangible, non-transitory memory that when operated on the processor(s) 118 performs one or more specific tasks, such as the tasks described below. The recording module and the analytics module may each include additional sub-modules and/or one or more routines. In some embodiments, the recording module and the analytics module may be part of a single program, routine, function, or the like, or may be separate programs, routines, functions or the like.

The wireless communication component 124 can be any component that enables wireless communication with an operations control center 136. For example, the wireless communication component 124 can be circuitry (including an antenna) that implements communication using Bluetooth, Wi-Fi, or the like. In other embodiments, the wireless communication component 124 can be circuitry (including an antenna) that implements communication using 4G communications or the like.

As shown in FIG. 1, the recording and analytics system 112 communicates wirelessly to a communications tower 128, e.g., a cellular communications tower. FIG. 1 illustrates various options for such communications. In a first option, the recording and analytics system 112 may communicate wirelessly to a mobile communications device 126 (e.g., a mobile telephone) through the wireless communication component 124 implementing Bluetooth, Wi-Fi, or the like. The mobile communications device 126 then relays communications wirelessly to the communications tower 128, such as by 4G communications. In a second option, the recording and analytics system 112 may communicate through a wired connection to the mobile communications device 126 through the third I/O interface 122. The mobile communications device 126 then relays communications wirelessly to the communications tower 128. In these options, the mobile communications device 126 may be carried by or proximate to the first person 102. In a third option, the recording and analytics system 112 may directly communicate wirelessly to the communications tower 128 through the wireless communication component 124 implementing 4G communications or the like. The mobile communications device 126 may be omitted in this option.

The communications tower 128 is coupled to a network 134, which may include the Internet, a wide area network (WAN), or the like. The operations control center 136 has a network 138, such as a local area network (LAN) coupled to the network 134. A database device 140, which operates a database with an appropriate database management system (DBMS), is in the operations control center 136 and is coupled to the network 138. Also, a terminal 142, such as a personal computer, a laptop, or the like, is in the operations control center 136 and is coupled to the network 138 by, e.g., a wired and/or wireless connection.

Figure 2:
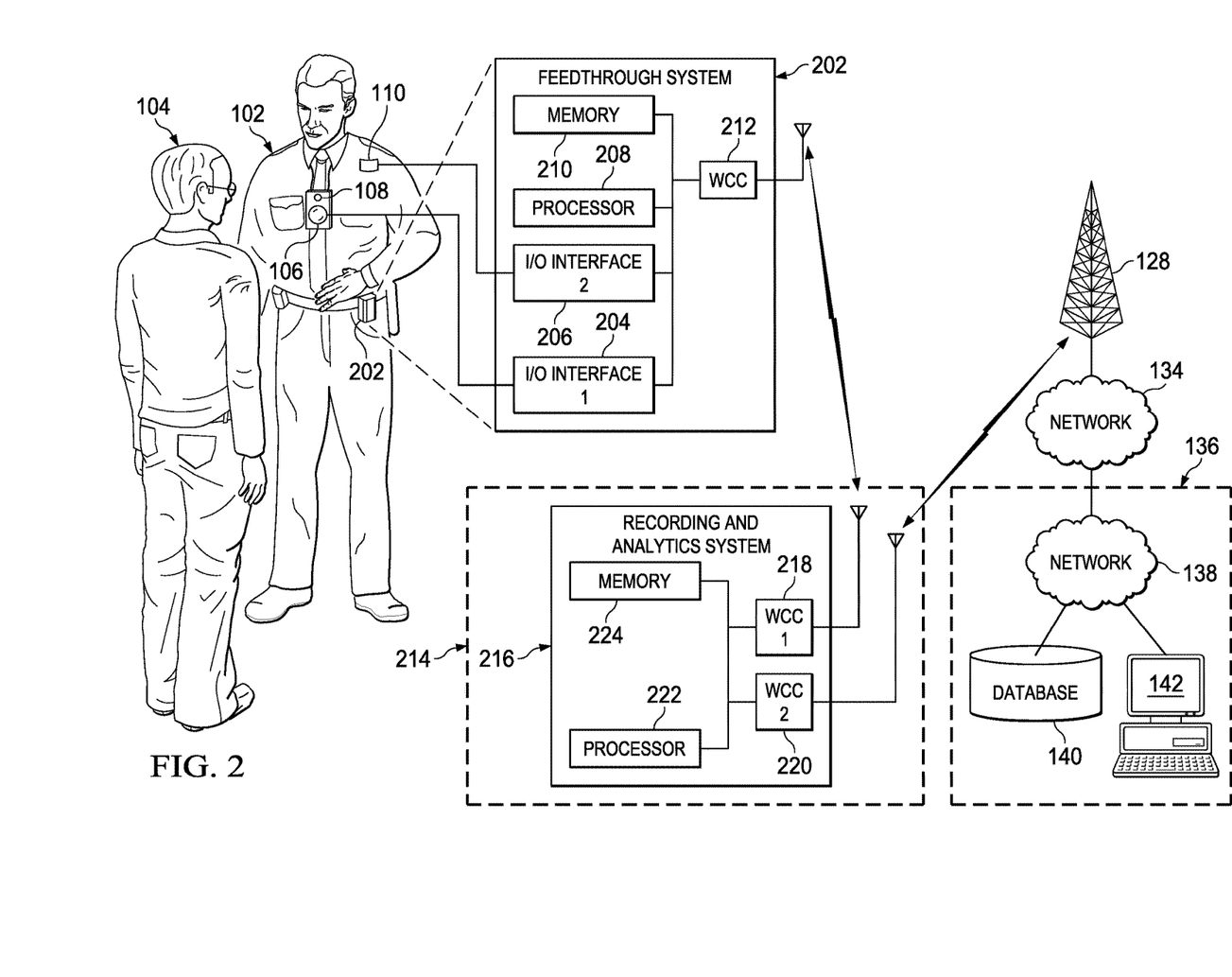
FIG. 2 is a diagrammatic illustration of a second example recording and analysis environment in accordance with some embodiments.

FIG. 2 is a diagrammatic illustration of an example recording and analysis environment in accordance with some embodiments. This embodiment is illustrated and discussed in the context of a distributed apparatus and system, a part of which can be worn on a user and another part of which is located off the body of the user. Many of the components discussed above with respect to FIG. 1 are illustrate in the environment shown in FIG. 2 with the same reference character. Discussion of these components is omitted for brevity.

In FIG. 2, instead of the recording and analytics system 112 being worn on the first person 102, a recording and analytics system 216 is off of the body of the first person 102. In this example, the recording and analytics system 216 is located in a mobile unit 214, such as a vehicle like a patrol car. In FIG. 2, the first person 102 wears a feedthrough system 202. As illustrated, the feedthrough system 202, which may be referred to as a computing system, includes a first I/O interface (I/O1) 204, a second I/O interface (I/O2) 206, one or more processor(s) (PROC) 208, memory (MEM) 210, and a wireless communication component (WCC) 212 coupled together, e.g., through a bus.

Each of the first and second I/O interfaces 204 and 206 is coupled to one or more input/output devices. The first I/O interface 204 is coupled to the video camera 106 with audio device 108, and the second I/O interface 206 is coupled to the sensory feedback device 110. In some embodiments, the first and second I/O interfaces 204 and 206 may be configured to coordinate I/O traffic between processor(s) 208, memory 210, and any peripheral devices in the device. In some embodiments, the first and second I/O interfaces 204 and 206 may perform any suitable protocol, timing or other data transformations to convert data signals from one component (e.g., video camera 106 with audio device 108) into a format usable by another component (e.g., processor(s) 208). In some embodiments, the first and second I/O interfaces 204 and 206 may include support for devices attached through various types of peripheral buses, such as a variant of the PCI bus standard or the USB standard, for example. In some embodiments, the function of the first and second I/O interfaces 204 and 206 may be split into two or more separate components, such as a north bridge and a south bridge, for example. In addition, in some embodiments, some or all of the functionality of the first and second I/O interfaces 204 and 206, such as an interface to memory 210, may be incorporated into processor(s) 208.

In various embodiments, the feedthrough system 202 may be a single-processor system including one processor 208, or a multi-processor system including two or more processors 208 (e.g., two, four, eight, or another suitable number). Processor(s) 208 may be any processor capable of executing program instructions. For example, in various embodiments, processor(s) 208 may be a general-purpose or embedded processor implementing any of a variety of ISAs, such as the x86, POWERPC®, ARM®, SPARC®, or MIPS® ISAs, or any other suitable ISA. In multi-processor systems, each of processors 208 may commonly, but not necessarily, implement the same ISA.

Memory 210 may be configured to store program instructions and/or data accessible by processor(s) 208. In various embodiments, memory 210 may be implemented using any suitable tangible or non-transitory storage memory, such as SRAM, SDRAM, nonvolatile/Flash-type memory, or any other type of memory. As illustrated, program instructions and data implementing certain operations, such as, for example, those described below, may be stored within memory 210 as program instructions and data storage, respectively. In other embodiments, program instructions and/or data may be received, sent or stored upon different types of computer-accessible media or on similar media separate from memory 210 or the recording and analytics system 216. Generally speaking, a computer-readable medium may include any tangible or non-transitory storage media or memory media such as magnetic or optical media—e.g., Flash memory, RAM, etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via the wireless communication component 212.

The wireless communication component 212 can be any component that enables wireless communication with the recording and analytics system 216. For example, the wireless communication component 212 can be circuitry (including an antenna) that implements communication using Bluetooth, Wi-Fi, or the like.

The feedthrough system 202 can operate a feedthrough module on the processor(s) 208. The feedthrough module may include program code instructions stored on the memory 210 or other tangible, non-transitory memory that when operated on the processor(s) 208 performs one or more specific tasks. The feedthrough module may include additional sub-modules and/or one or more routines. The feedthrough module can receive video and audio data from the video camera 106 with audio device 108 through the first I/O interface 204. The feedthrough module can store the video and audio data in a cache or queue in memory 210 before transmitting the video and audio data through the wireless communication component 212. The feedthrough module can format or re-format the video and audio data in any appropriate format for storage in the cache or queue or for transmission.

The recording and analytics system 216 is in the mobile unit 214. As illustrated, the recording and analytics system 216, which may be referred to as a computing system, includes one or more processor(s) (PROC) 222, memory (MEM) 224, a first wireless communication component (WCC1) 218, and a second wireless communication component (WCC2) 220, with each coupled together, e.g., through a bus.

In various embodiments, the recording and analytics system 216 may be a single-processor system including one processor 222, or a multi-processor system including two or more processors 222 (e.g., two, four, eight, or another suitable number). Processor(s) 222 may be any processor capable of executing program instructions. For example, in various embodiments, processor(s) 222 may be a general-purpose or embedded processor implementing any of a variety of ISAs, such as the x86, POWERPC®, ARM®, SPARC®, or MIPS® ISAs, or any other suitable ISA. In multi-processor systems, each of processors 222 may commonly, but not necessarily, implement the same ISA.

Memory 224 may be configured to store program instructions and/or data accessible by processor(s) 222. In various embodiments, memory 224 may be implemented using any suitable tangible or non-transitory storage memory, such as SRAM, SDRAM, nonvolatile/Flash-type memory, or any other type of memory. As illustrated, program instructions and data implementing certain operations, such as, for example, those described below, may be stored within memory 224 as program instructions and data storage, respectively. In other embodiments, program instructions and/or data may be received, sent or stored upon different types of computer-accessible media or on similar media separate from memory 224 or the recording and analytics system 216. Generally speaking, a computer-readable medium may include any tangible or non-transitory storage media or memory media such as magnetic or optical media—e.g., Flash memory, RAM, etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via the second wireless communication component 220.

The recording and analytics system 216 can operate a recording module and an analytics module on the processor(s) 222. The recording module and the analytics module may each include program code instructions stored on the memory 224 or other tangible, non-transitory memory that when operated on the processor(s) 222 performs one or more specific tasks, such as tasks described below. The recording module and the analytics module may each include additional sub-modules and/or one or more routines. In some embodiments, the recording module and the analytics module may be part of a single program, routine, function, or the like, or may be separate programs, routines, functions or the like.

The first wireless communication component 218 can be any component that enables wireless communication with the feedthrough system 202 (e.g., via the wireless communication component 212). For example, the first wireless communication component 218 can be circuitry (including an antenna) that implements communication using Bluetooth, Wi-Fi, or the like. The second wireless communication component 220 can be any component that enables wireless communication with the operations control center 136. In some embodiments, the second wireless communication component 220 can be circuitry (including an antenna) that implements communication using 4G communications or the like.

A person of ordinary skill in the art will also appreciate that the above-discussed computer systems (e.g., recording and analytics system 112 or 216 and feedthrough system 202) are merely illustrative and are not intended to limit the scope of the disclosure described herein. In particular, the computer systems and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figure 3:
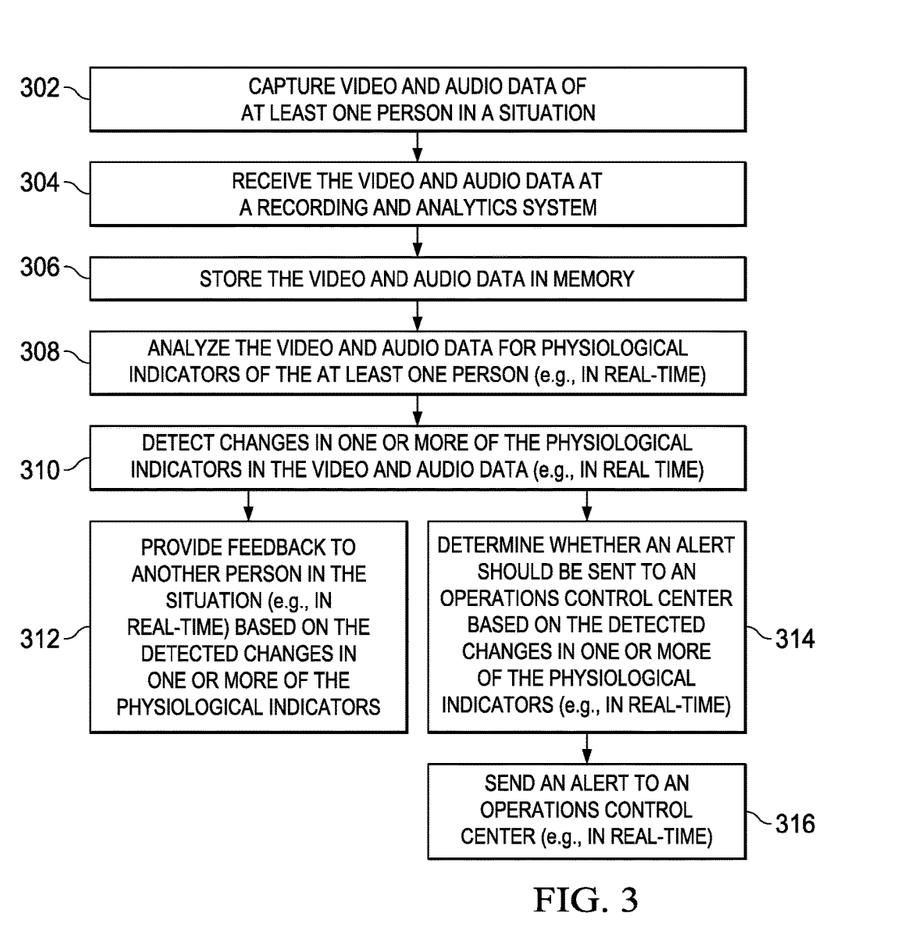
FIG. 3 is a flowchart of an example implementation of a process for detecting a change of a physiological indicator of a person within video and audio data and for providing feedback to indicate when the change occurs in accordance with some embodiments.

FIG. 3 is a flowchart of an example implementation of a process for detecting a change of a physiological indicator of a person within video and audio data and providing feedback to indicate when the change occurs in accordance with some embodiments of the present systems and methods. The process of FIG. 3 is discussed below as operating in the context of the systems of FIGS. 1 and 2, as illustrated. One of ordinary skill in the art will readily understand that the method of FIG. 3 may operate in other environments and systems, such as in modifications of FIGS. 1 and 2 discussed above or other environments and systems.

In step 302, video and audio data of at least one person in a situation is captured by a video camera and audio device. In some embodiments, the video and audio data is of a communication and/or interaction between multiple people, such as the first person 102 and second person 104. In the context of FIGS. 1 and 2, the video camera 106 captures video data of the second person 104, such as during a communication and interaction between the first person 102 and second person 104, and the audio device 108 captures audio data, such as the communication between the first person 102 and second person 104.

In step 304, the video and audio data is received at a recording and analytics system. In the context of FIG. 1, the video and audio data is received at the recording and analytics system 112 from the video camera 106 with audio device 108 via the first I/O interface 114. In the context of FIG. 2, the video and audio data is received at the recording and analytics system 216 via the feedthrough system 202. The feedthrough system operates a feedthrough module on the processor(s) 208. The feedthrough module receives the video and audio data via the first I/O interface 204 and temporarily stores the video and audio data in a cache or queue in the memory 210. The feedthrough module then formats the data for wireless transmission through the wireless communication component 212 and transmits the video and audio data through the wireless communication component 212 to the recording and analytics system 216. At the recording and analytics system 216, the first wireless communication component 218 receives the video and audio data.

In step 306, the video and audio data is stored in memory. In some instances, the video and audio data may be stored directly into memory. In other instances, the video and audio data may be formatted, or re-formatted, for storage. In the context of FIG. 1, the video and audio data, using the recording module of the recording and analytics system 112 operating on the processor(s) 118, may be stored in memory 120 until the data is offloaded from the recording and analytics system 112. In the context of FIG. 2, the video and audio data is received via the first wireless communication component 218, and, using the recording module of the recording and analytics system 216 operating on the processor(s) 222, may be stored in memory 224 until the data is offloaded from the recording and analytics system 216.

In step 308, the video and audio data is analyzed for physiological indicators of the at least one person. The analysis can be performed in real-time as the video and audio is received at the recording and analytics system. The physiological indicators can include heart rate, blood pressure, breathing rate, unconscious expressions, body temperature, speaking volume, speaking rate, voice frequency, or the like.

The physiological indicators can be detected through the video and audio data using any acceptable technique. In some embodiments, heart rate, blood pressure, breathing rate, and body temperature can be detected as described in U.S. Pat. No. 8,965,090 to Khachaturian et al., issued on Feb. 24, 2015, and entitled "Non-Touch Optical Detection of Vital Signs," disclosure of which is hereby incorporated herein in its entirety. In some embodiments where body temperature may be detected, an infrared detector may be used to detect a body temperature. In some embodiments, unconscious expressions can be detected using any acceptable object recognition and tracking algorithm for processing video data, and in some embodiments, speaking volume, speaking rate, and voice volume can be detected using any acceptable speech processing algorithm for processing audio data.

In the context of the systems of FIGS. 1 and 2, the analytics module of the recording and analytics system 112 or 216 operating on the processor(s) 118 or 222 performs the detection of the physiological indicators in some embodiments. The analytics module may access the video and audio data from memory 120 or 224. The analytics module may then perform algorithms upon the video and/or audio data to detect the physiological indicators of the at least one person.

In step 310, changes in one or more of the physiological indicators are detected in the video and audio data. For example, a baseline of a given physiological indicator can be provided, and a variation from the baseline of that physiological indicator can be determined from the video and audio data. The baseline can be determined by analyzing the video and audio data, and/or by a predefined amount. For example, an average measurement of the physiological indicator can be determined for the baseline, such as determined as a running average of the video and audio data. In some embodiments, any change from a baseline is detected, and in some embodiments, any change that is thought to be statistically significant can be detected, such as a change that exceeds a given first threshold for a particular physiological indicator. In the context of the systems of FIGS. 1 and 2, the analytics module can, after detecting the physiological indicators, determine whether a change of the physiological indicators has occurred in the video and audio data.

In step 312, once a change in physiological indicator has been detected, feedback is provided to another person in the situation based on the detected change in the physiological indicators. The feedback can be in real-time. In the context of FIG. 1, once the analytics module determines a change in a physiological indicator (e.g., one that exceeds a given threshold, as discussed above), the analytics module can transmit an indication of the change through the second I/O interface 116 to the sensory feedback device 110. In the context of FIG. 2, once the analytics module determines a change in a physiological indicator (e.g., one that exceeds a given threshold, as discussed above), the analytics module can transmit an indication of the change through the first wireless communication component 218 to the feedthrough system 202. The feedthrough system 202 receives the indication and transmits the indication through the second I/O interface 206 to the sensory feedback device 110. In both systems of FIGS. 1 and 2, the sensory feedback device 110 can then provide an indication to the first person 102 of the change in the physiological indicator. The sensory feedback device 110 can provide, e.g., a tone, a vibration, or the like to the first person 102. A unique tone can indicate a particular physiological indicator; a unique location of a vibration can indicate a particular physiological indicator; or the like.

In response to the feedback, the first person 102 can take action to address the situation that gave rise to the change in the physiological indicator. For example, if the physiological indicator is indicative of stress that arises from a person lying to, e.g., a law enforcement officer, the first person 102 can take action to investigate why the person is lying, such as by asking more probing questions. If the physiological indicator is indicative of hostility, the first person 102 can take action to de-escalate the situation and calm the person. The feedback can be in real-time and can detect a condition earlier than a human alone could since the early indications of a condition might be imperceptible to a human eye.

In step 314, once a change in physiological indicator has been detected, the analytics module determines whether an alert should be sent to an operations control center based on the detected change in the physiological indicator, and if so, in step 316, the analytics module sends the alert to the operations control center. These steps, 314 and 316 may be performed in real-time. If the physiological indicator continues to change, the change could be indicative of an escalating situation, and hence, another person (e.g., a back-up law enforcement officer) may need to be dispatched into the situation to help control the situation. Thus, for example, if the change in physiological indicator exceeds a second threshold (e.g., equal to, in some embodiments, or greater than, in other embodiments, the first threshold in step 310), then the analytics module sends an alert to the operations control center.

In the context of the system of FIG. 1, multiple modifications are illustrated to show how an alert can be communicated to the operations control center 136. In one modification, the analytics module transmits the alert via the wireless communication component 124 directly to the communications tower 128, such as by wireless 4G communication. In another modification, the analytics module transmits the alert via the wireless communication component 124 to the mobile communications device 126, such as by Wi-Fi wireless communication, and the mobile communications device 126 transmits the alert to the communications tower 128, such as by 4G wireless communications. In a further modification, the analytics module transmits the alert via a wired connection from the third I/O interface 122 to the mobile communications device 126, and the mobile communications device 126 transmits the alert to the communications tower 128, such as by 4G wireless communications. In these modifications, the alert is transmitted from the communications tower 128 through the network 134 to the operations control center 136, where the alert is transmitted through the network 138 to the terminal 142.

In the context of the system of FIG. 2, the analytics module transmits the alert via the second wireless communication component 220 directly to the communications tower 128, such as by wireless 4G communication. The alert is transmitted from the communications tower 128 through the network 134 to the operations control center 136, where the alert is transmitted through the network 138 to the terminal 142.

In some embodiments, only an alert is transmitted from the analytics module and received at the terminal 142, and upon receipt of the alert, an operator at the terminal 142 can dispatch another person to the scene of the first person 102. In other embodiments, an alert is sent, and real-time video and audio data is streamed from the analytics module and received at the terminal 142 upon the sending of the alert. In these embodiments, an operator at the terminal 142 can view the video and audio to make an independent determination whether to dispatch another person to the scene of the first person 102.

In some embodiments, changes in the physiological indicators that are detected, feedback that is sent to the sensory feedback device 110, and/or alerts that are transmitted to the operations control center 136 are tagged in and/or to the corresponding locations (e.g., times) in the video and audio data where the event(s) occurred. In some embodiments, the tag is stored within the data structure of the video and audio data, and in some embodiments, the tag is stored in another data structure with an indicator (e.g., pointer) of where in the video and audio data the change occurred. The tag can also include an indication of a duration that the physiological indicator was in the detected state, such as by including an ending location (e.g., time) of the data. The tag can include an indication of which physiological indicator had the change that was detected (e.g., by keywords) and information relating to the change of the physiological indicator (e.g., an amount of variation from the baseline for that physiological indicator). In the context of the systems of FIGS. 1 and 2, the analytics module can store tags in the memory 120 and 224.

In some embodiments, video and audio data, with any tags, stored in the memory 120 and 224 is periodically uploaded to the database operating on the database device 140 and/or other tangible, non-transitory memory medium. The upload can be by wireless communication, wired communication, or a combination thereof. For example, in a modification of the system of FIG. 1, the video and audio data, with any tags, can be transmitted wirelessly by the recording module through the wireless communication component 124 directly to the communications tower 128 and through the networks 134 and 138 to the database operating on the database device 140. In another modification of the system of FIG. 1, the video and audio data, with any tags, can be transmitted wirelessly by the recording module through the wireless communication component 124 to the mobile communications device 126, which transmits wirelessly the video and audio data to the communications tower 128 and through the networks 134 and 138 to the database operating on the database device 140. In a further modification of the system of FIG. 1, the video and audio data, with any tags, can be transmitted by wired connection by the recording module through the third I/O interface 122 to the mobile communications device 126, which transmits wirelessly the video and audio data to the communications tower 128 and through the networks 134 and 138 to the database operating on the database device 140.

In the context of the system of FIG. 2, the video and audio data, with any tags, can be transmitted wirelessly by the recording module through the second wireless communication component 220 directly to the communications tower 128 and through the networks 134 and 138 to the database operating on the database device 140. Alternatively or additionally, the recording and analytics system 112 and 216 can be connected to the database device 140 through a direct wired connection, or can be connected by a wired connection to the network 138, to upload or offload video and audio data, with any tags, to the database operating on the database device. Once the video and audio data, with any tags, is successfully uploaded to the database operating on the database device 140, and/or offloaded onto other tangible, non-transitory memory medium, the video and audio data and any tags can be erased from the memory 120 and 224 to free memory 120 and 224 for storing more video and audio data and any tags.

The video and audio data and the tags as stored in the database operating on the database device 140 and/or other tangible, non-transitory memory medium can be stored in any acceptable data structure. A user, such as at a terminal connected to the network 138, can access and/or query this information for subsequent investigations and/or data mining. This ability can allow authorities to more efficiently identify relevant portions of video and audio data during an investigation.

With the tags, a user, such as at a terminal connected to the network 138, can query the database operating on the database device 140 to access relevant video and audio data based on the tags. For example, the user can identify a specific tag, and be directed to the beginning of the video and audio data where the change(s) in physiological indicators occurred (or earlier to gain context of the change(s)) to review what happened in the video and audio data. This indexing can allow for more efficient searches and identification of information within video and audio data.

Further, tags can be correlated to determine if there was a possible emotional change or other occurrence that occurred within the video and audio data that is based on the physiological indicators. For example, a change in one physiological indicator may not necessarily be indicative of a possible emotional change or other occurrence; however, in some instances, a combination of multiple physiological indicator may indicate a possible event, such as one of the participants is possibly lying, is possibly stressed, is possibly angry, etc. Various combinations of physiological indicators may be predefined as indicative of a possible emotional change or other occurrence, and these predefined combinations can be compared with the tags in and/or to a particular location (e.g., time) of the video and audio data to determine if the combination of tags at that location are indicative of a possible emotional change or other occurrence in the video and audio data.

Such an indication of a possible emotional change or other occurrence that occurred in the video and audio data can be stored to memory and/or output to a user. If the indication is stored to memory, in some embodiments, the possible emotional change or other occurrence may be stored within the data structure of the video and audio data to indicate where the possible emotional change or other occurrence occurred within the video and audio data, and in some embodiments, the possible emotional change or other occurrence may be stored in another data structure with an indicator (e.g., pointer) of where in the video and audio data the possible emotional change or other occurrence occurred within the video and audio data.

In the context of the systems of FIGS. 1 and 2, the analytics module can store a possible emotional change or other occurrence in the memory 120 and 224. The stored data can then be accessed for subsequent investigations, data mining, or the like. The possible emotional change or other occurrence can also be transmitted from the analytics module to the sensory feedback device 110.

Additionally, in some embodiments if the change(s) of physiological indicators is output to a person as real-time feedback, the person may become aware of an escalating situation earlier and may de-escalate the situation more easily by the earlier detection. Further, in some embodiments where alerts are sent to an operations control center, reporting of situations for dispatching back-up can occur earlier and automatically. In some instances, a law enforcement officer may be unable to call back to an operations control center to request back-up because that officer may be overcome trying to handle a situation; however, an automatic alert to the operations control center can help ensure that back-up may be dispatched appropriately. Additionally, the automatic alert can help cover for law enforcement officers that may not adhere to protocol for requesting back-up.

Although the present embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from this disclosure, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
  using an analytics module operating on at least one processor:
    receiving data from a video camera worn on a first person, the data being indicative of an interaction between the first person and a second person;
    detecting a physiological indicator of the second person by analyzing the data;
    determining a change in the physiological indicator in the data;
    determining a change in an emotional state of the second person based on the changes in the physiological indicators; and
    transmitting an indication of the change in the emotional state of the second person to a sensory device on the first person, wherein the sensory device includes a vibrational motor to provide a vibration sensation to the first person upon receipt of the indication of the change in the emotional state.

2. The method of claim 1, wherein the data includes video data.

3. The method of claim 1, wherein the data include audio data.

4. The method of claim 1, wherein the transmitting the indication of the change in the emotional state is in real-time with an actual, change in the emotional state of the second person.

5. The method of claim 1, wherein the sensory device includes an earbud with a speaker to provide a tone to the first person upon receipt of the indication of the change in the emotional state.

6. The method of claim 1, wherein the physiological indicator includes heart rate, blood pressure, breathing rate, an unconscious expression, body temperature, speaking volume, speaking rate, voice frequency, or a combination thereof.

7. The method of claim 1 further comprising, using the analytics module, transmitting an alert based on the change in the physiological indicator to a terminal at an operations control center in real-time.

8. The method of claim 7 further comprising transmitting at least a portion of the data to the terminal with the alert.

9. The method of claim 1, wherein the determining the change in the physiological indicator includes:
   determining a baseline of the physiological indicator from the data; and
   determining when the physiological indicator deviates from the baseline in the data by at least a threshold value.

10. The method of claim 1 further comprising, using a recording module operating on at least one processor, storing the data in memory.

11. The method of claim 10 further comprising storing a tag in the memory, the tag being indicative of where in the data the change in the physiological indicator occurred.

12. The method of claim 11, wherein the tag includes a keyword indicative of the physiological indicator.

13. A system comprising:
   a video and audio device configured to be worn on a first person and being operable to capture video and audio data representative of at least a second person;
   an analytics system having an analytics module operable on at least one processor, the analytics system being operatively coupled to the video and audio device, the analytics module being operable to receive the video and audio data, and further operable to identify a physiological indicator of the second person in the video and audio data, and further operable to determine a change in the physiological indicator in the video and audio data, and further operable to determine a change in an emotional state of the second person based on the changes in the physiological indicators; and
   a sensory feedback device operatively coupled to the analytics system and configured to be worn on the first person, the analytics module further being operable to transmit an indication of the change in the emotional state of the second person to the sensory feedback device, the sensory feedback device being operable to provide a sensory indication to the first person upon receipt of the indication of the change in the emotional state, wherein the sensory feedback device includes a vibrational motor to provide a vibration sensation to the first person upon receipt of the indication of the change in the emotional state.

14. The system of claim 13, wherein the video and audio device further includes an infrared detector.

15. The system of claim 13 further comprising a feedthrough system operatively coupled to the video and audio device and the sensory feedback device, the feedthrough system having a feedthrough module operable on at least one processor, the feedthrough module being operable to receive the video and audio data from the video and audio device and to wirelessly transmit the video and audio data to the analytics system, the feedthrough module being further operable to receive the indication of the change in the emotional state from the analytics system and to transmit the indication to the sensory feedback device.

16. The system of claim 13, wherein the analytics module is further operable to transmit an alert based on the change in the emotional state to an operations control center.

17. A non-transitory computer-readable storage medium having a computer program embodied thereon, the computer program comprising:
   program code instructions for detecting a physiological indicator in video and audio data, the video and audio data being representative of an interaction between a first person and a second person, the physiological indicator being of the second person;
   program code instructions for determining a change in the physiological indicator in the video and audio data;
   program code instructions for determining a change in an emotional state of the second person based on the changes in the physiological indicators; and
   program code instructions for transmitting to a sensory feedback device on the first person an indication of the change in the emotional state of the second person, wherein the sensory device includes a vibrational motor to provide a vibration sensation to the first person upon receipt of the indication of the change in the emotional state.

18. The non-transitory computer-readable storage medium of claim 17, wherein the program code instructions for determining the change in the physiological indicator comprises:
   program code instructions for determining a baseline of the physiological indicator from the video and audio data; and
   program code instructions for determining when the physiological indicator deviates from the baseline in the video and audio data by at least a threshold value.

19. The non-transitory computer-readable storage medium of claim 17, wherein the computer program code further comprises program code instructions for transmitting an alert based on the change in the physiological indicator to an operations control center.

* * * * *